United States Patent
Froeschner et al.

(10) Patent No.: US 7,628,679 B2
(45) Date of Patent: Dec. 8, 2009

(54) TRIMMING COMPOSITE SKIN STIFFENER ENDS

(75) Inventors: Neal A. Froeschner, Florissant, MO (US); Jim S. Piszar, Chesterfield, MO (US)

(73) Assignee: The Boeing Company, Chicago, IL (US)

(*) Notice: Subject to any disclaimer, the term of this patent is extended or adjusted under 35 U.S.C. 154(b) by 513 days.

(21) Appl. No.: 11/549,807

(22) Filed: Oct. 16, 2006

(65) Prior Publication Data

US 2008/0090495 A1    Apr. 17, 2008

(51) Int. Cl.
*B24B 9/00*    (2006.01)
(52) U.S. Cl. .......................... 451/28; 451/439; 451/241
(58) Field of Classification Search ............ 451/438, 451/439, 358, 241, 387, 365, 457, 237, 545, 451/380, 28
See application file for complete search history.

(56) References Cited

U.S. PATENT DOCUMENTS

| | | | |
|---|---|---|---|
| 2,258,858 A * | 10/1941 | Meadowcroft | 428/594 |
| 3,656,920 A * | 4/1972 | Helms | 451/358 |
| 4,035,224 A | 7/1977 | Anderson | |
| 5,622,733 A * | 4/1997 | Asher | 425/504 |
| 7,074,474 B2 * | 7/2006 | Toi et al. | 428/102 |
| 7,496,424 B2 | 2/2009 | Froeschner et al. | |

* cited by examiner

*Primary Examiner*—Robert Rose
(74) *Attorney, Agent, or Firm*—Haynes & Boone, LLP.

(57) ABSTRACT

A tool for trimming the ends of stiffeners on aircraft composite skin panels accurately, rapidly and without damaging the underlying skins includes an expandable guide frame adapted to straddle and clamp to the stiffener at a selected longitudinal position thereon. The frame includes a pair of planar guide faces disposed on opposite sides of the stiffener and lying in a common plane transverse thereto. The rotatably supported opposite ends of a rotating abrasive drum are slid along respective ones of the guide faces such that the drum grinds away the stiffener in a plane parallel to the plane of the guide faces and thereby forms a trimmed end on the stiffener. The frame includes mechanisms for adjusting the angular inclination of the plane of the guide faces relative to the plane of the composite skin, and for preventing the grinding mechanism from cutting into the composite skin.

23 Claims, 5 Drawing Sheets

TRIMMING COMPOSITE SKIN STIFFENER ENDS

BACKGROUND

The present disclosure relates to manufacturing tooling, in general, and in particular, to apparatus and methods for trimming the ends of stiffeners disposed on composite skin panels.

Composite aircraft structures promise several benefits for the commercial aircraft industry, including airframes that are both substantially lighter and/or stronger than their aluminum predecessors. Several design considerations are critical to a successful, safe composite aircraft structure design. Two of these, impact resistance and damage tolerance, are critical driving factors for structure weight and cost. Because of these two design requirements, composite fuselage skin structures utilize a minimum gage, or thickness, that is thicker than that actually needed for carrying gross vehicle design loads.

It is known that, by adding elongated stiffening elements to composite skin panels, the panel skin thicknesses can be reduced without reducing panel strength and rigidity. In general, closed "hat" stiffeners provide great torsional rigidity, bending stiffness, and buckling resistance in composite structures for many aircraft applications, such as fuselages. Hat-stiffened composite structures thus typically result in lighter structural weight with less material and manufacturing cost.

One issue with these types of stiffeners is that their as-cured ends need to be "cleaned-up," i.e., trimmed uniformly to size, after curing. Trimming composite parts is not new, but one problem with skin stiffening elements such as hat stiffeners is that often they do not extend out to the edge of the skins, where trimming of their ends flush with the skin edge would be relatively easy, but instead, terminate within the part boundary. This also results in the hat end interfacing in some way with the inside surface of the skin plies themselves.

The current method for effecting such trimming is to grind or cut the ends of the stiffeners away by hand, yielding a less-than-desirable control of shape and size, with some danger of damage to the underlying skin, and a substantial consumption of time and labor.

Thus, there is a long-felt but as yet unsatisfied need for a fast, reliable tool that enables the end of the hat-shaped stiffeners of composite skin panels to be trimmed at a specific location, with a uniform, desired end shape, and without damaging underlying skin plies.

BRIEF SUMMARY

In accordance with the exemplary embodiments thereof disclosed herein, the present invention provides apparatus and methods that enable trimming of the ends of stiffeners on composite skin panels rapidly, at a specific location, with a uniform, desired end shape, and without damaging the underlying skin plies.

In one particular exemplary embodiment thereof, the apparatus comprises an expandable guide frame adapted to straddle and clamp to the stiffener at a selected longitudinal position thereon. The frame includes a pair of planar guide faces disposed on opposite sides of the stiffener and lying in a common plane transverse to the stiffener. The rotatably supported opposite ends of a central shaft of a rotating abrasive drum are slid along respective ones of the guide faces of the frame such that the drum grinds, or abrades away, the stiffener in a plane parallel to the plane of the guide faces and thereby forms a uniformly trimmed end on the stiffener.

In one particular exemplary embodiment, the guide frame comprises a pair of upstanding A-shaped half-structures, each defining a pair of legs and a pair of lateral clamping surfaces of the frame, and each including an elongated, laterally extending member adapted to engage the laterally extending member of the other half-structure across the top of the stiffener in a complementary, male-female sliding engagement. A witness tab may be provided on the frame for aligning the frame longitudinally on the stiffener. The witness tab includes an alignment edge lying in the plane of abrasion of the grinding drum and is disposed adjacent to and parallel with a side wall of the stiffener when the frame is disposed on the stiffener.

The exemplary apparatus further comprises: A mechanism for pulling the pair of half-structures of the frame toward each other laterally across the stiffener such that the lateral clamping surfaces of the frame forcefully engage respective side walls of the stiffener and thereby clamp the frame to the stiffener, a mechanism for adjusting the angular inclination of the plane of the guide faces of the frame relative to the plane of the underlying composite skin, and a mechanism for limiting the lowermost vertical position to which the two opposite ends of the shaft of the rotating abrasive drum can slide on the guide faces.

In one particular exemplary embodiment, the rotating abrasive drum can include an elongated handle with a motor, e.g., an air motor, having a right angled drive with an output end coupled to and rotatably supporting a first end of the shaft of the drum, and a second elongated support handle having right-angled lower end rotatably supporting an opposite second end of the drum shaft.

In one particular preferred exemplary embodiment, the frame is fabricated by a Direct Digital Manufacturing (DDM) process, and the grinding drum can incorporate standard commercial, off-the-shelf components available from many hardware stores.

An exemplary embodiment of a method for using the apparatus to trim an end of a stiffener of a composite skin panel comprises straddling the stiffener with the guide frame of the apparatus, clamping the guide frame to the stiffener at a selected longitudinal position thereon; and sliding the rotatably supported opposite ends of the shaft of the rotating abrasive drum of the apparatus along respective ones of the guide faces of the guide frame such that the drum abrades away the stiffener in a plane parallel to the plane of the guide faces and thereby forms a trimmed end on the stiffener.

The apparatus and methods of the invention enable the ends of stiffeners on composite skin panels to be trimmed quickly and reliably, at a specific location thereon, with a uniform, desired end shape, and without damaging the underlying skin plies.

A better understanding of the above and many other features and advantages of the stiffener end trimming apparatus and methods of the invention may be obtained from a consideration of the detailed description of some exemplary embodiments thereof below, particularly if such consideration is made in conjunction with the appended drawings, wherein like reference numerals are used to identify like elements illustrated in one or more of the figures thereof.

DETAILED DESCRIPTION

Figure 1:
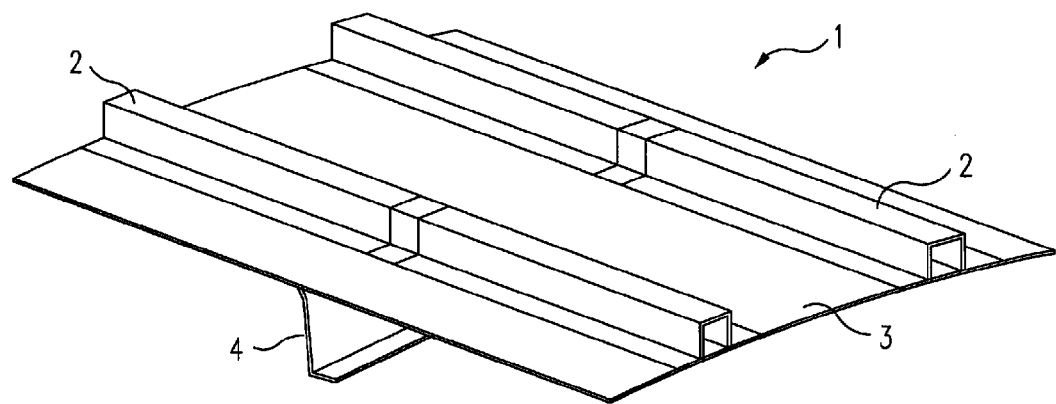
FIG. 1 is a partial upper front and right side perspective view of an exemplary embodiment of a composite skin panel of an aircraft having a plurality of elongated "hat stiffeners" that require end trimming on the skin thereof.
Figure 2:
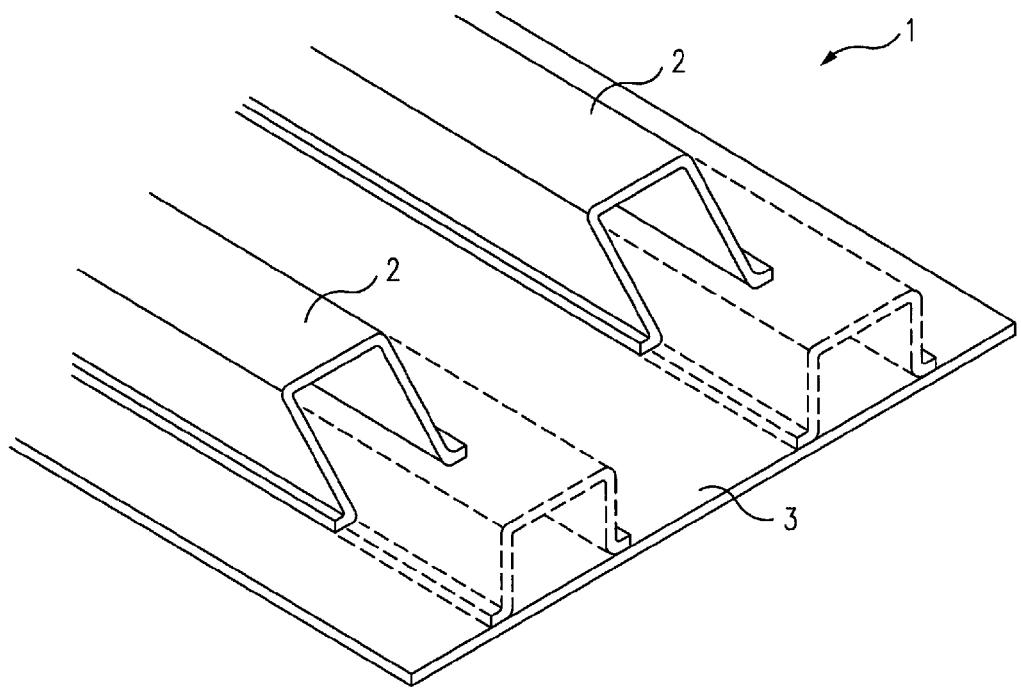
FIG. 2 is an enlarged partial upper front and right side perspective view of the composite skin panel of FIG. 1, showing the stiffeners with ends trimmed thereon using the exemplary embodiments of the apparatus and methods of the present invention.

FIG. 1 is a partial upper front and right side perspective view of an exemplary embodiment of a composite skin panel 1 of, e.g., an aircraft structure having a plurality of elongated "hat stiffeners" 2 disposed on the composite skin 3 thereof, and which have ends that require trimming. FIG. 2 is an enlarged partial upper front right side perspective view of the composite panel 1 of FIG. 1, showing the ends of the stiffeners 2 after being trimmed with an exemplary embodiment of the apparatus of the present invention, in the manner described in more detail below.

With reference to FIG. 1, the exemplary skin panel 1 comprises a composite planar skin 3, e.g., a matrix of a hard, strong epoxy resin having carbon fibers or filaments disposed therein. One problem associated with such stiffeners 2 is that their ends need to be trimmed uniformly to a desired size and configuration after they are cured, such as illustrated in FIG. 2. In many such applications, the stiffeners do not extend out to the edge of the skins, as shown in FIG. 1, where trimming of the ends flush with the skin edge would be relatively easy, but instead, need to be terminated within the boundary of the skin 3, as illustrated in FIG. 2. This situation also results in the ends of the stiffener interfacing in some way with the upper plies of the skin.

In previous stiffener end trimming methods, the ends of the stiffeners 2 are ground or cut away by hand, yielding a less-than-desirable control of stiffener end shape and size, with the additional risk of causing damage to the underlying skin plies, and a substantial expenditure of time and manual labor.

Figure 3:
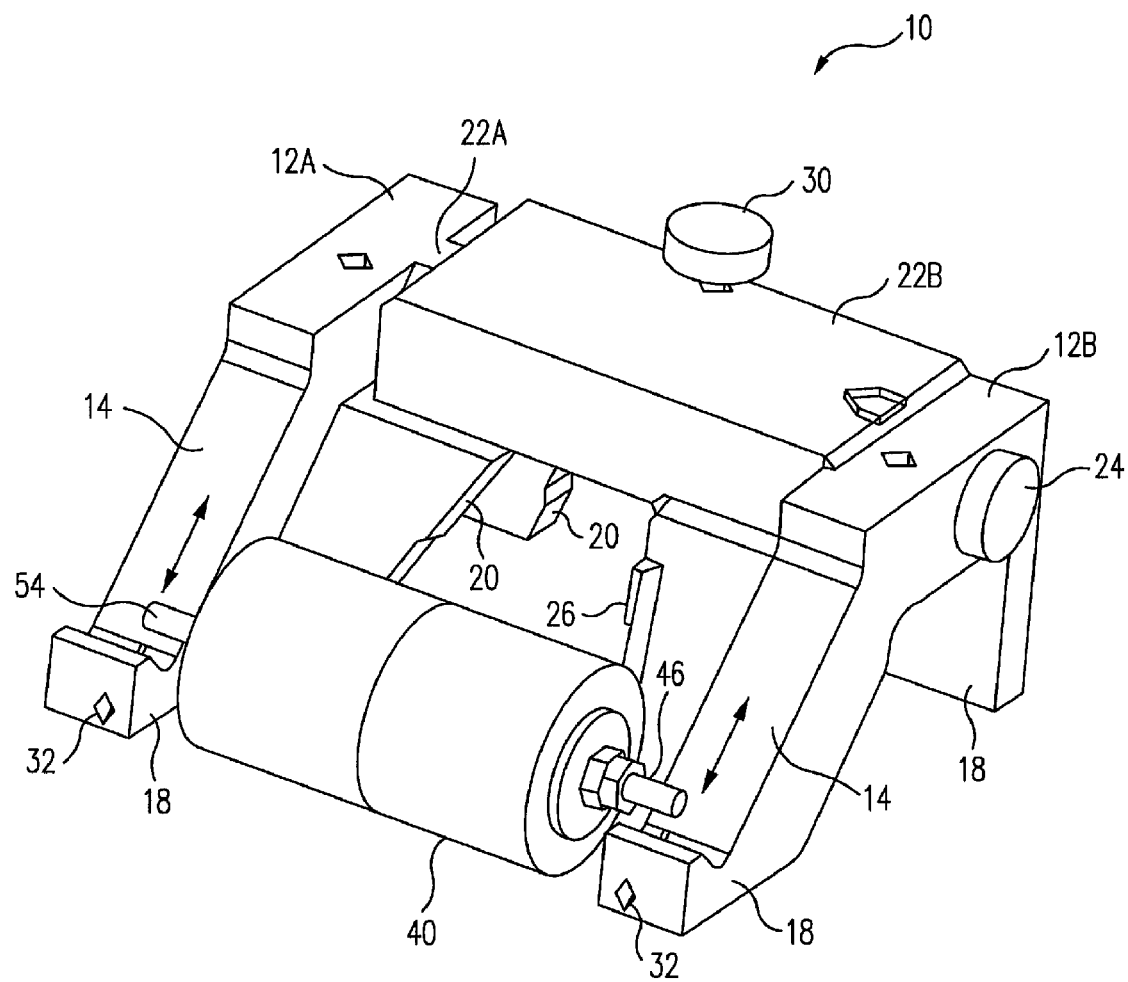
FIG. 3 is a partial upper front and left side perspective view of an exemplary embodiment of an apparatus for trimming the ends of the stiffeners of the composite skin panel in the manner shown in FIG. 2 in accordance with the present invention.
Figure 4:
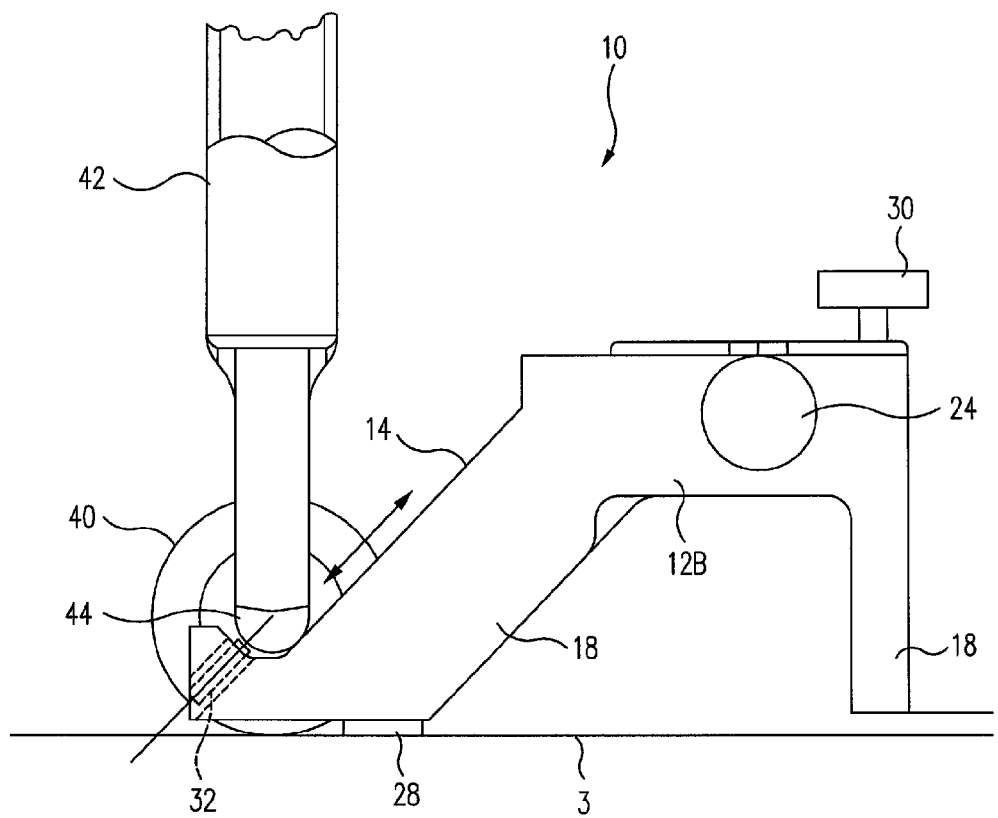
FIG. 4 is a partial left side elevation view of the stiffener end trimming apparatus of FIG. 3.
Figure 5A:
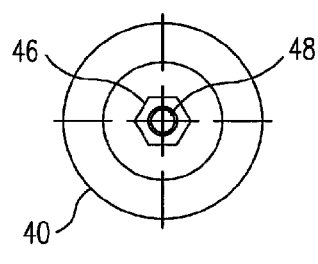
FIGS. 5A and 5B are end and front elevation views, respectively, of a rotating abrasive grinding drum of the exemplary apparatus of FIG. 4.
Figure 5B:
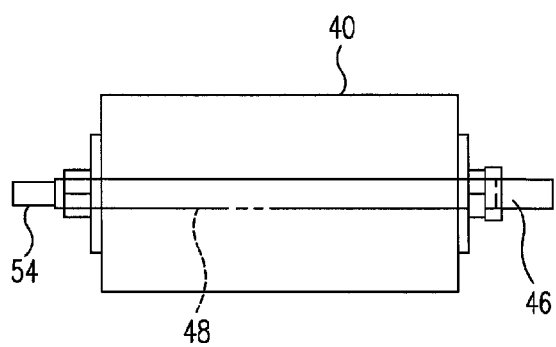

An exemplary embodiment of an apparatus 10 for trimming the ends of the stiffeners 2 of the composite skin panel 1 in accordance with the present invention that overcomes the above and other problems of the prior art trimming methods and apparatus is illustrated in the partial upper front and left side perspective and left side elevation views of FIGS. 3 and 4, respectively. As may be seen by reference to these figures, the apparatus comprises two main components or portions, viz., a guide frame 12 and a rotating abrasive grinding drum 40 portion, which are designed to work cooperatively with each other to achieve the desired stiffener end trimming operation rapidly and accurately, in the manner described below.

In particular, the guide frame 12 is adapted to straddle and clamp to a stiffener 2 at a selected longitudinal position thereon, and of importance, includes a pair of planar guide faces 14 disposed on opposite sides of the stiffener and lying in a common plane transverse to the stiffener. The rotating abrasive drum tool 40 includes a central support shaft 48 having a pair of opposite ends 46 and 54, each rotatably supported by a lower end of a respective tool handle, and arranged to slide along respective ones of the guide faces of the guide frame such that the grinding drum abrades away the stiffener in a plane parallel and spaced below and behind the plane of the guide faces and thereby forms a trimmed end on the stiffener, in the manner described in more detail below.

Figure 6:
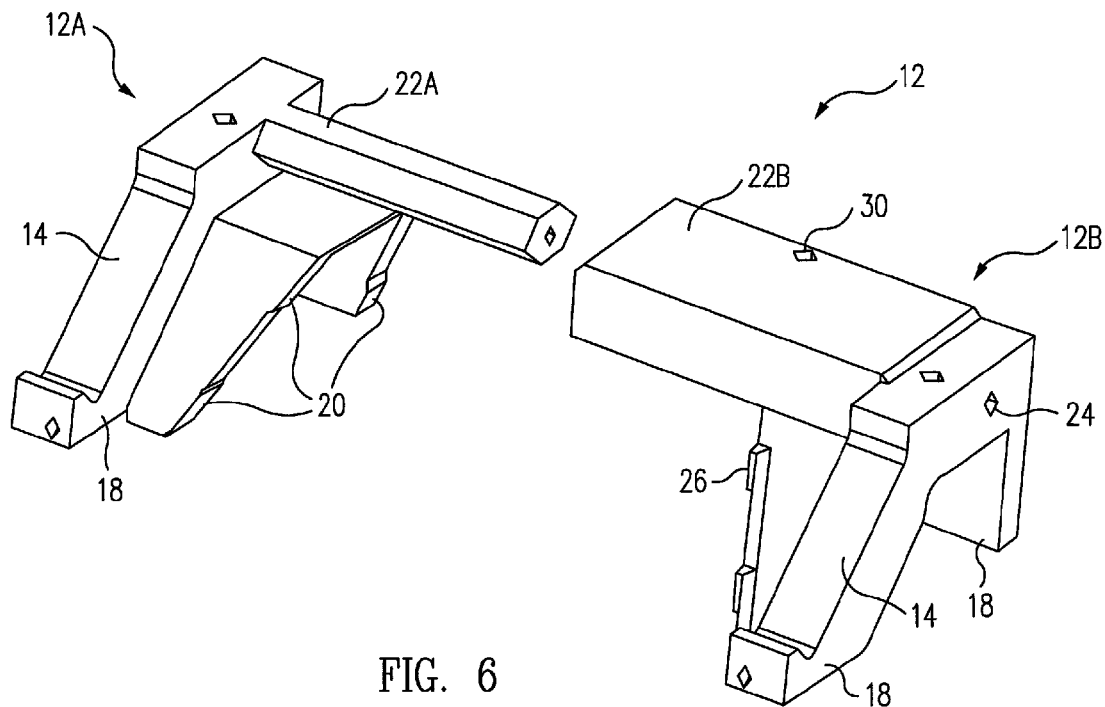
FIG. 6 is a partial upper front and left side perspective view of an expandable guide frame of the exemplary apparatus of FIG. 4, showing two half-structures of the frame expanded apart and separated from each other.
Figure 7:
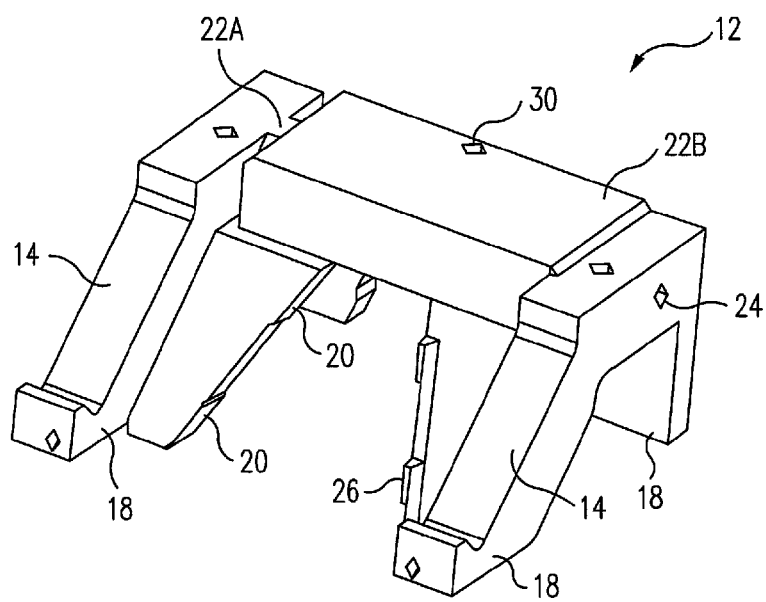
FIG. 7 is a partial upper front and left side perspective view of the guide frame of FIG. 6, showing the two half-structures of the frame pulled together laterally to form a single guide frame structure.

In the particular exemplary embodiment illustrated, the guide frame 12 comprises a pair of upstanding A-shaped half-structures 12A and 12B, each defining a respective pair of legs 18 and a pair of inward-facing lateral clamping surfaces 20 of the guide frame, and as illustrated in FIGS. 6 and 7, each A-shaped half-structure also respectively includes an elongated, laterally extending member 22A or 22B that is adapted to engage the laterally extending member of the other structure across the top of the stiffener in an opposing, complementary, male-female sliding engagement.

This arrangement enables the guide frame 12 to be firmly clamped to the stiffener 2 that is to be trimmed at the selected longitudinal position thereon. In the particular exemplary embodiment illustrated, this clamping is effected by the provision of a screw mechanism 24 provided with an optional finger knob for turning by hand, which extends laterally through the laterally extending member 22B of one of the guide frame half-structures 12B and into corresponding female threads in the laterally extending member 22A of the other guide frame half-structure 12A. Turning the screw mechanism 24 causes the pair of A-shaped frame structures 12A and 12B to be pulled or contracted toward each other laterally across the top of the stiffener 2 such that the inward-facing lateral clamping surfaces 20 of the guide frame forcefully engage a respective side wall of the stiffener and thereby clamp the frame to the stiffener.

Figure 9:
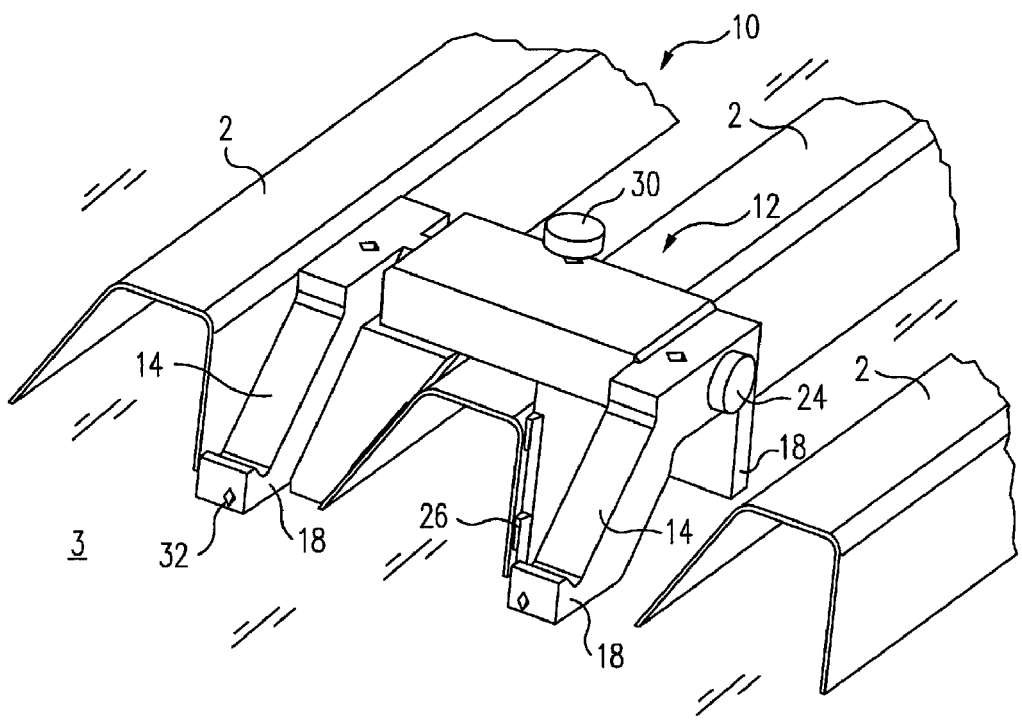

As illustrated in FIGS. 6, 7 and 9, in a preferred embodiment, the apparatus includes a "witness tab" 26 on the guide frame 12 that is used to align the apparatus 10 longitudinally on the stiffener 2 at the selected longitudinal position at which the end is to be trimmed on the stiffener. The witness tab is disposed adjacent to and parallel with a side wall of the stiffener when the frame is disposed on the stiffener, and has an alignment edge that lies in the cutting plane, i.e., the plane of abrasion, of the grinding drum 40. In use, the sidewall of the stiffener adjacent to the witness tab is marked with a line corresponding to the desired location of the trimmed end of the stiffener. The frame is then positioned on the stiffener so as to straddle the stiffener, and the frame is then moved longitudinally relative to the stiffener until the alignment edge of the witness tab is aligned with the line marked on the stiffener. When the rotatably supported opposite ends of the abrasive grinding drum are then slid down the respective guide faces 14 on the guide frame, the drum abrades away the stiffener in a plane corresponding to the line marked on the side of the stiffener.

In one possible embodiment, the witness tab 26 can be formed oversized during the fabrication of the guide frame 12 and then partially sanded away before the first use of the tool by making a single pass down the guide faces 14 of the frame with the particular grinding drum 40 that is to be used with the tool so as to form the alignment edge on the tab. This "calibration" technique ensures that the alignment edge of the witness tab lies precisely in the plane of abrasion of the particular grinding drum which is to be used with the frame, which in turn, precisely defines the plane of the trimmed end of the stiffener formed with the particular combination of drum and frame.

In the particular exemplary embodiment illustrated in the figures, the guide frame 12 may include a pair of resilient feet 28, each disposed at a lower end of an associated front leg 18 of the frame 12, such as illustrated in FIG. 4. As illustrated in the figures, the exemplary apparatus 10 also preferably includes a mechanism 30 on the guide frame 12 for adjusting the angular inclination of the plane of the guide faces 14 relative to the plane of the composite skin 3. This mechanism enables the angle of inclination of the guide faces, and hence, the angle of inclination of the plane of the end cut on the stiffener 2 effected by the abrasive grinding drum 40, to be finely adjusted relative to the plane of the underlying composite skin 3 before the trimming operation is begun. In the particular embodiment illustrated, the inclination adjustment mechanism 30 comprises a threaded shaft (not visible in the figures) provided with an optional finger knob for turning by hand, that extends vertically through the laterally extending member 22B of one of the guide frame half-structures 12B and emerges on the lower side thereof to contact the top surface of the stiffener. Screwing the threaded shaft up and down acts to tilt the back side of the guide frame, and hence, the angle of inclination of the plane of the guide faces 14, down and up relative to the stiffener, respectively.

The guide frame 12 of the apparatus 10 preferably includes another adjustment mechanism 32 for limiting the lowermost vertical position to which the rotatably supported opposite ends 46 and 54 of the grinding drum 40 can slide on the guide faces 14 so as to prevent the grinding drum from undesirably cutting into the plies of the underlying composite skin 3. As illustrated in, e.g., FIG. 3, this limiting mechanism can comprise a pair of screws or threaded shafts that screw into respective corresponding threaded openings disposed on opposite sides of the frame and extending into the frame at an inclined angle so as to emerge at the lower ends of the respective guide faces 14. The screws are screwed into the openings such that their upper ends are respectively disposed at the lowest position to which the respective rotatably supported opposite ends of the grinding drum are permitted to move, thereby acting like "limit stops" to control the lowermost position to which the grinding drum can travel on the guide faces.

In the particular exemplary embodiment illustrated in the figures, the rotating abrasive drum 40 portion of the apparatus 10 comprises a pair of handles, viz., an elongated motor handle 42 equipped with a right angled drive at its lower end 44, the drive having its output coupled to a first, or driven, end 46 of the central shaft 48 of the drum, and for ergonomic ease of use, a second elongated support handle 50 (see FIG. 8) having a right-angled lower end 52 rotatably supporting an opposite second, or follower, end 54 of the drum shaft, for a convenient, two-handed manipulation of the grinding drum.

The motor of the motor handle may comprise, e.g., a conventional air motor or an electric motor. The respective right angled lower ends 44 and 52 of the two handles 42 and 50, each of which respectively supports a respective one of the two opposite ends 46 and 54 of the central shaft 48 of the abrasive drum 40 for rotation, are preferably made of a relatively hard, smooth material, such as a metal or polycarbonate plastic, so as to enable them to slide along the respective guide faces 14 of the guide frame 12 smoothly and without frictional resistance during the grinding of the stiffener ends.

An exemplary embodiment of a method for using the apparatus 10 to trim a uniform end on a composite skin stiffener 2 comprises marking a sidewall of the stiffener with a line corresponding to the desired location of the trimmed end of the stiffener, and then straddling the stiffener with the guide frame 12 of the apparatus and clamping it lightly to the stiffener with the clamping mechanism 24. The frame is then moved longitudinally along the stiffener until the alignment edge of the witness tab 26 is aligned with the line marked on the stiffener. If desired, the angle of inclination of the guide faces 14 of the frame may also be adjusted relative to the stiffener using the inclination adjustment mechanism 30, as described above. Additionally, the lowermost vertical position to which the rotating abrasive drum 40 is allowed to move on the guide faces 14 can be adjusted using the above limit stop mechanisms 32 of the apparatus. As will be understood by those of skill in the art, in a typical end-trimming "batch" process, these latter adjustments of the frame 12 relative to the stiffener 2 will typically only have to be made once, i.e., before the first end is trimmed, and thereafter, the only alignment of the tool required will be its longitudinal position relative to the trim lines marked on the stiffeners.

Figure 8:
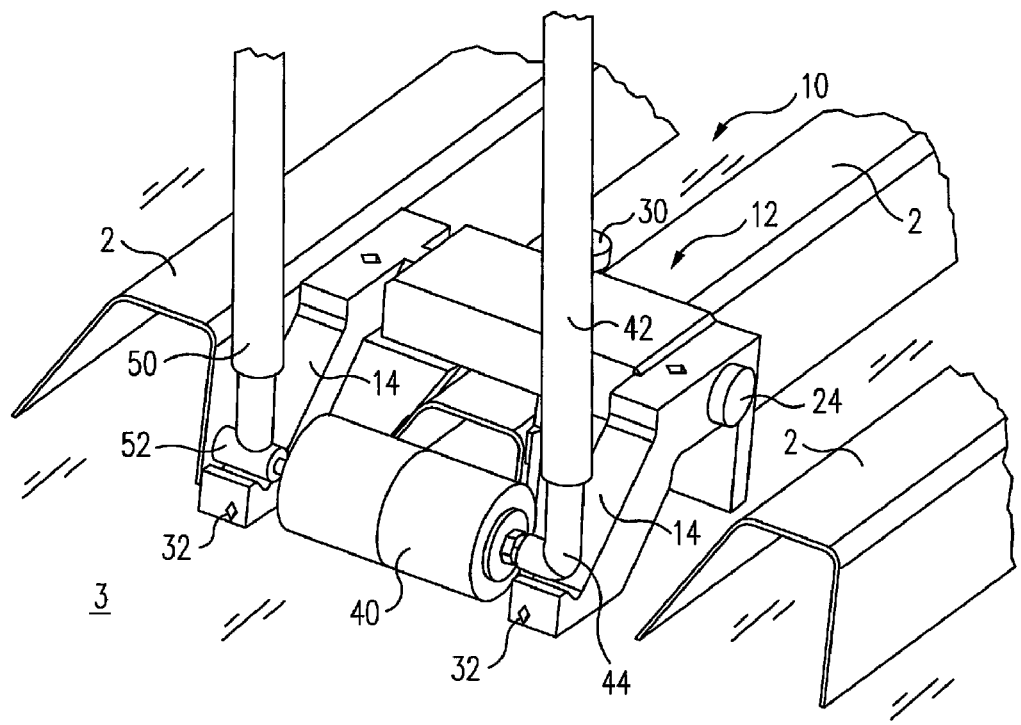
FIG. 8 is a partial upper front and left side perspective view of the guide frame of the apparatus clamped on a stiffener of a composite skin panel during an exemplary embodiment of a method for trimming an end on the stiffener in accordance with the present invention, showing the rotatably supported opposite ends of a shaft of a grinding drum portion of the apparatus being slid along respective ones of a pair of guide faces of the frame such that the drum abrades away the stiffener in a plane parallel to the plane of the guide faces and thereby forms a trimmed end on the stiffener; and, FIG. 9 is a perspective view similar to FIG. 8, in which the grinding drum portion of the apparatus has been removed to show the resulting trimmed end of the stiffener.

When the guide frame is disposed in the desired longitudinal, vertical and angular positions relative to the stiffener, the two half-structures 12A and 12B are pulled together using the clamping mechanism 24 such that the respective opposing lateral clamping surfaces 20 of the frame 12 forcefully contact the respective side walls of the stiffener and clamp the frame firmly to the stiffener. As illustrated in FIG. 8, using the two handles 42 and 50 of the abrasive grinding drum 40, and simultaneously causing the abrasive drum to rotate at an efficient cutting speed with the motor of the motor handle, the operator then slides the respective lower ends 44 and 52 of the handles, each rotatably supporting a respective one of the opposite ends 46 and 54 of the central shaft 48 of the rotating abrasive drum, along respective ones of the guide faces 14 of the guide frame such that the drum abrades away the stiffener in a plane that is parallel to and disposed below the plane of the guide faces, and which corresponds precisely to the line marked on the side wall of the stiffener, and thereby forms a trimmed end on the stiffener, as illustrated in FIG. 9. If desired, the guide frame can be clamped at intermediate longitudinal positions between an initial position and the final trim position marked by the line so that the material of the stiffener is trimmed away in smaller, incremental steps, rather than all at once.

As those of skill in the art will appreciate, the guide frame 12 of the apparatus 10 enables several precisely located and somewhat unrelated surfaces and features to be accommodated by each of the guide frame half-structures 12A and 12B. Ordinarily, this would necessitate considerable complicated machining operations being involved in the production of the frame. Multiple machining set-ups would be required, and mating surfaces would require a toolmaker to hand-fit the two half-structures of the frame to ensure correct operation. However, it has been discovered that, by using Direct Digital Manufacturing (DDM) techniques to fabricate the tool halves, these tool manufacturing complexities and costs can be substantially reduced. For example, using a Fused Deposition Modeling (FDM) process with a polycarbonate material enables the guide frame half-structures to be fabricated precisely as designed with virtually no programming or machine tool setup required. The resultant guide frame halves are lightweight, possess an inherent low friction sliding surface for the grinding apparatus, and require very little secondary finish work, other than the tapping of four holes that are already provided by the FDM process. Additionally, this process also enables other features, such as dust collection channels, to be "grown in" the parts at no additional cost or complexity.

The abrasive grinding drum 40 portion of the apparatus 10 is even simpler to confect. The only "customized" portion required is the rotating support shaft 54 of the drum, which is made to mount a commercial, off-the-shelf (COTS) sanding drum to a standard air-driven motor incorporating a right-angle drive 44. The abrasive drum 40 assembly itself typically comes with a shaft meant to be chucked in a conventional die grinder or hand drill. Hence, it is preferable to provide a customized shaft that is better adapted to having its opposite ends 46 and 54 respectively chucked to the right angled lower ends 44 and 52 of the drive motor and second support handles 42 and 50 to better meet the needs of the trimming operation described above. Except for this, the other components of the abrasive grinding portion of the apparatus are typically available at many reasonably well-stocked hardware stores.

By now, those of skill in this art will appreciate that many modifications, substitutions and variations can be made in and to the stiffener end trimming apparatus and methods of the present invention without departing from its spirit and scope. For example, depending on the particular hat, or other, stiffener cross-sectional shape, the clamping force provided by the lateral clamping surfaces 20 of the guide frame 12 may not be sufficient to hold the guide firmly in position. Accordingly, space can be provided on the underside of the guide frame to enable supplemental pneumatic vacuum cups (not illustrated) to be attached to the underside of the frame. These vacuum cups may be used to apply extra suction forces to hold the guide in position, and can accommodate many types of uneven or off-axis surfaces.

In light of the foregoing, the scope of the present invention should not be limited to that of the particular embodiments illustrated and described herein, as they are only exemplary in nature, but instead, should be fully commensurate with that of the claims appended hereafter and their functional equivalents.

What is claimed is:

1. An apparatus for trimming an end of a stiffener on a composite skin, comprising:
    a guide frame adapted to straddle and clamp to the stiffener at a selected longitudinal position thereon, and having a pair of planar guide faces disposed on opposite sides of the stiffener and lying in a common plane transverse thereto; and,
    a rotating abrasive drum having rotatably supported opposite ends adapted to slide along respective ones of the guide faces of the frame such that the drum abrades away the stiffener in a plane parallel to the plane of the guide faces and forms a trimmed end on the stiffener.

2. The apparatus of claim 1, further comprising a witness tab disposed on the frame, the tab having an alignment edge lying in the plane of abrasion of the drum and being disposed adjacent to and parallel with a side wall of the stiffener when the frame is disposed on the stiffener.

3. The apparatus of claim 1, wherein the guide frame comprises a pair of upstanding A-shaped half-structures, each defining a pair of legs and a pair of lateral clamping surfaces of the frame and including an elongated, laterally extending member adapted to engage the laterally extending member of the other half-structure across the top of the stiffener in an opposing complementary sliding engagement.

4. The apparatus of claim 3, further comprising a mechanism for pulling the pair of structures of the frame toward each other laterally across the top of the stiffener such that the lateral clamping surfaces of the frame forcefully engage a respective side wall of the stiffener and clamp the frame to the stiffener.

5. The apparatus of claim 1, further comprising a mechanism on the frame for adjusting the angular inclination of the plane of the guide faces relative to the plane of the composite skin.

6. The apparatus of claim 1, further comprising a mechanism on the frame for limiting the lowermost vertical position to which the rotatably supported opposite ends of the abrasive drum can slide on the guide faces.

7. The apparatus of claim 1, wherein the rotating abrasive drum comprises an elongated motor having a right angled drive with an output end coupled to a first end of a central support shaft of the drum.

8. The apparatus of claim 7, wherein the motor comprises an air motor or an electric motor.

9. The apparatus of claim 7, further comprising an elongated support handle having right-angled lower end rotatably supporting an opposite second end of the central support shaft of the shaft.

10. The apparatus of claim 1, wherein the frame is fabricated by a Direct Digital Manufacturing (DDM) process.

11. The apparatus of claim 10, wherein the material of the frame comprises a polycarbonate material and is fabricated by a Fused Deposition Modeling (FDM) process.

12. A method for trimming an end of a stiffener on a composite skin, the method comprising:
    straddling the stiffener with the guide frame of the apparatus of claim 1;
    clamping the guide frame to the stiffener at a selected longitudinal position thereon; and,
    sliding the rotatably supported opposite ends of the rotating abrasive drum of the apparatus along respective ones of the guide faces of the guide frame such that the drum abrades away the stiffener in a plane parallel to the plane of the guide faces and forms a trimmed end on the stiffener.

13. The method of claim 12, wherein clamping the frame at the selected longitudinal position on the stiffener comprises:
    disposing a witness tab on the frame, the tab having an alignment edge lying in the plane of abrasion of the drum and being disposed adjacent to and parallel with a side wall of the stiffener when the frame is disposed on the stiffener;
    marking the sidewall of the stiffener adjacent to the witness tab with a line corresponding to the desired location of the trimmed end of the stiffener; and,
    moving the frame longitudinally relative to the stiffener until the alignment edge of the witness tab is aligned with the line marked on the stiffener.

14. The method of claim 12, wherein clamping the frame to the stiffener comprises:
    bifurcating the frame into a pair of upstanding half-structures, each having one of a pair of opposed lateral clamping surfaces thereon and an elongated, laterally extending member adapted to engage the laterally extending member of the other half-structure across the stiffener in a opposed complementary sliding engagement; and, pulling the two half-structures toward each other laterally across the stiffener such that the respective lateral clamping surfaces of the frame forcefully engage a corresponding side wall of the stiffener and clamp the stiffener therebetween.

15. The method of claim 12, further comprising adjusting the angular inclination of the plane of the guide faces relative to the plane of the composite skin.

16. The method of claim 12, further comprising limiting the lowermost vertical position to which the rotatably supported opposite ends of the rotating abrasive drum can slide on the guide faces.

17. An apparatus for trimming an end of a stiffener on a composite skin, comprising:
   a pair of planar guide faces disposed on opposite sides of the stiffener and lying in a common plane transverse thereto; and,
   a grinding mechanism for grinding away the stiffener in a plane parallel to the plane of the guide faces and forming a trimmed end on the stiffener.

18. The apparatus of claim 17, further comprising a mechanism for clamping the guide faces to the stiffener at a selected longitudinal position thereon.

19. The apparatus of claim 17, further comprising a mechanism for adjusting the angular inclination of the plane of the guide faces relative to the plane of the composite skin.

20. The apparatus of claim 17, further comprising a mechanism for preventing the grinding mechanism from cutting into the composite skin.

21. A method for trimming an end of a stiffener on a composite skin, the method comprising:
   positioning a pair of planar guide faces on opposite sides of the stiffener and lying in a common plane transverse thereto; and,
   grinding away the stiffener in a plane parallel to the plane of the guide faces to form a trimmed end on the stiffener.

22. The method of claim 21, further comprising clamping the guide faces to the stiffener at a selected longitudinal position thereon.

23. The method of claim 21, further comprising adjusting the angular inclination of the plane of the guide faces relative to the plane of the composite skin.

\* \* \* \* \*

UNITED STATES PATENT AND TRADEMARK OFFICE
CERTIFICATE OF CORRECTION

PATENT NO. : 7,628,679 B2 Page 1 of 1
APPLICATION NO. : 11/549807
DATED : December 8, 2009
INVENTOR(S) : Froeschner et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 566 days.

Signed and Sealed this

Second Day of November, 2010

David J. Kappos
*Director of the United States Patent and Trademark Office*